US010855766B2

(12) United States Patent
Zou et al.

(10) Patent No.: US 10,855,766 B2
(45) Date of Patent: Dec. 1, 2020

(54) NETWORKING SWITCH WITH OBJECT STORAGE SYSTEM INTELLIGENCE

(71) Applicant: Intel Corporation, Santa Clara, CA (US)

(72) Inventors: Yi Zou, Portland, OR (US); Arun Raghunath, Hillsboro, OR (US); Anjaneya Reddy Chagam Reddy, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 103 days.

(21) Appl. No.: 15/718,756

(22) Filed: Sep. 28, 2017

(65) Prior Publication Data
US 2019/0098085 A1 Mar. 28, 2019

(51) Int. Cl.
G06F 16/27 (2019.01)
H04L 29/08 (2006.01)
H04L 12/931 (2013.01)
H04L 12/933 (2013.01)
H04L 12/855 (2013.01)

(52) U.S. Cl.
CPC .......... H04L 67/1097 (2013.01); H04L 49/15 (2013.01); H04L 49/356 (2013.01); H04L 67/1095 (2013.01); H04L 47/2466 (2013.01); H04L 67/32 (2013.01)

(58) Field of Classification Search
CPC .............. H04L 29/08072; H04L 29/06; H04L 67/2809; H04L 45/20; G06F 16/27
USPC .................... 709/220, 224, 227, 226, 228
See application file for complete search history.

(56) References Cited

U.S. PATENT DOCUMENTS

| 9,577,874 | B2* | 2/2017 | D'Souza | H04L 45/28 |
| 9,633,051 | B1* | 4/2017 | Maccanti | G06F 11/1469 |
| 9,928,168 | B2* | 3/2018 | Molloy | G06F 12/0638 |
| 9,935,887 | B1* | 4/2018 | Maharia | H04L 47/365 |
| 10,025,673 | B1* | 7/2018 | Maccanti | G06F 11/1451 |
| 10,038,624 | B1* | 7/2018 | Cruz | H04L 45/16 |
| 10,341,285 | B2* | 7/2019 | Warfield | G06F 16/256 |
| 2002/0091636 | A1* | 7/2002 | Carroll Bullard | G06Q 20/102 705/40 |
| 2011/0196828 | A1* | 8/2011 | Drobychev | G06F 16/275 707/622 |
| 2011/0294472 | A1* | 12/2011 | Bramwell | H04W 40/244 455/413 |
| 2012/0278804 | A1* | 11/2012 | Narayanasamy | H04L 47/15 718/1 |
| 2013/0232260 | A1* | 9/2013 | Narayana | H04L 67/1036 709/224 |
| 2014/0025770 | A1* | 1/2014 | Warfield | G06F 15/17331 709/213 |

(Continued)

Primary Examiner — Khanh Q Dinh
(74) Attorney, Agent, or Firm — Compass IP Law PC

(57) ABSTRACT

A method performed by a networking switch in an object storage system. The method includes receiving a first packet from a network comprising an object ID and a data object. The method includes generating a replica for the data object. The method includes generating an object ID for the replica of the data object. The method includes determining a destination storage node for the replica of the data object. The method includes sending a second packet from the networking switch to the destination storage node. The second packet includes the object ID for the replica of the data object and the replica of the data object.

19 Claims, 9 Drawing Sheets

(56) References Cited

U.S. PATENT DOCUMENTS

| | | | |
|---|---|---|---|
| 2014/0269261 A1* | 9/2014 | D'Souza | H04L 41/0668 370/225 |
| 2014/0317261 A1* | 10/2014 | Shatzkamer | G06F 9/455 709/223 |
| 2014/0317293 A1* | 10/2014 | Shatzkamer | G06F 9/455 709/226 |
| 2015/0124809 A1* | 5/2015 | Edsall | H04L 47/20 370/390 |
| 2015/0125112 A1* | 5/2015 | Frankel | H04B 10/271 385/16 |
| 2017/0094002 A1* | 3/2017 | Kumar | H04L 67/2861 |
| 2017/0228290 A1* | 8/2017 | Maccanti | G06F 11/1469 |

\* cited by examiner

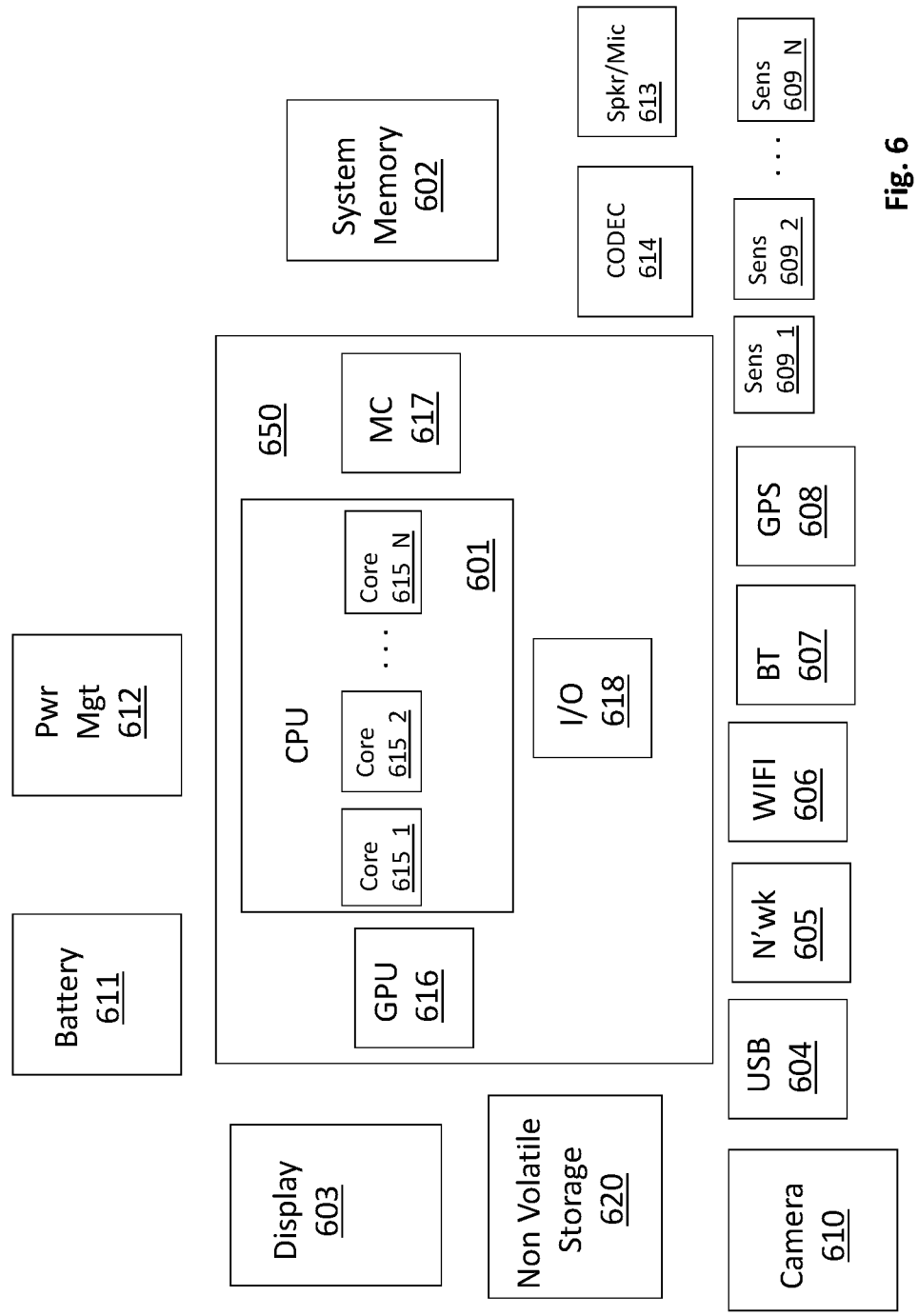

NETWORKING SWITCH WITH OBJECT STORAGE SYSTEM INTELLIGENCE

FIELD OF INVENTION

The field of invention pertains generally to the computing sciences, and, more specifically, to a networking switch with object storage system intelligence.

BACKGROUND

Large enterprises typically process a tremendous amount of information in real-time. Part of the processing includes storing data in a storage system and retrieving data that is stored in the storage system. Large enterprises generally require that the storage system be reliable (not lose data) and have high performance (store/retrieve data quickly). As such, storage system designers are highly motivated to improve storage system reliability and performance.

FIGURES

A better understanding of the present invention can be obtained from the following detailed description in conjunction with the following drawings, in which:

FIG. 6 shows a computing system.

DETAILED DESCRIPTION

Figure 1A:
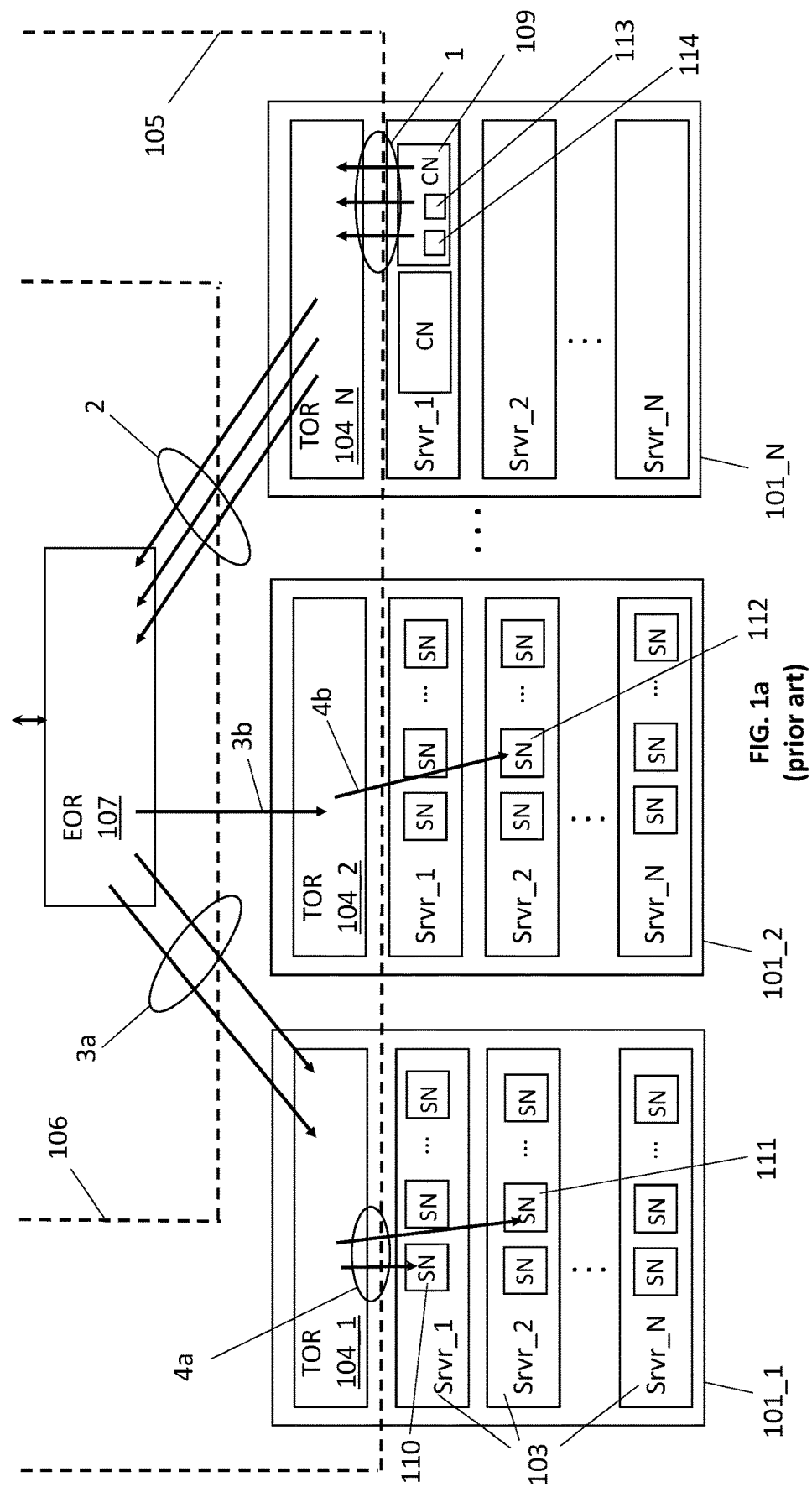
FIG. 1a shows a prior art object storage write process.

FIG. 1a shows a prior art data center. As is known in the art, a typical data center includes one or more "racks" 101_1, 101_2, . . . 101_N where each rack includes one or more servers 103 and a network router or switch 104 (hereinafter referred to as "switch"). The server(s) 103 and switch 104 of a same rack 101 are typically coupled proximately to one another, e.g., in a same mechanical fixture or frame in which server(s) and switch(es) may slide on rails on the sidewalls of the frame and mount to the back of the frame so that the installed equipment in the frame takes on the appearance of, e.g., a bookcase.

The proximate coupling of the server(s) 103 and switch 104 in a same rack 101 provides for various space/distance efficiencies such as, e.g., forming interconnections between the server(s) 103 and the switch 104 with copper wires that plug into a patch panel of the rack. Other possible efficiencies include cooling the server(s) 103 and switch 104 with a same fan system that is integrated in the rack, powering the server(s) and switch from a same electrical outlet, etc.

The rack's switch 104 provides a platform communication for the rack's server(s) to communicate with one another and to connect to a larger network 105 of the data center that, e.g., other racks are coupled to. The switch 104 is commonly referred to as the "top of rack" (TOR) because its traditional location is the top shelf of the rack 101. Here, the TORs 104_1 through 104_N of their respective racks 101_1 through 101_N can be viewed as the gateway to the data center's network 105.

An EOR unit 107 helps economize the configuration, management and networking of multiple racks 101_1 through 101_N. Here, EOR unit 107 is typically a switch that provides communication services for multiple racks. That is, servers within different racks 101_1 through 101_N where the different racks 101_1 through 101_N are associated with a same EOR 107 can communicate to one another through the EOR switch 107. Additionally, the EOR 107 provides the servers of its constituent racks 101_1 through 101_N to, e.g., the data center's backbone network 106 to which are coupled multiple EORs and their corresponding racks.

The term "end or row" has traditionally been used to refer to an EOR unit 107 (because the EOR was traditionally an end rack of a row of racks). However, more generally, an EOR unit 107 is a unit that is associated with multiple racks 101_1 through 101_N to provide communication services for the multiple racks 101_1 through 101_N (e.g., communication between racks 101_1 through 101_N and access to the data center's backbone network 106).

The servers 103 of the data center typically include multiple CPUs capable of executing the respective program code of various kinds of software applications. One type of software application is an object storage software application. An object storage software application may include client access nodes (or client nodes) "CN" and storage nodes "SN". The client access nodes act as gateways to the storage facilities for users of the object storage system (e.g., other application software programs that have storage needs, individuals, etc.). As such, the client access nodes typically accept data objects from the users that are to be written into the storage system and provide data objects to the users that were read from the storage system.

The storage nodes of the object storage application are responsible for storing data objects in the physical storage resources associated with the server that they execute on (e.g., non volatile storage of the server). Object storage systems identify individual data items to be stored as objects were each object typically has an identifier of the object (object ID). Commonly, a hashing algorithm is executed on the object ID by the object storage system to identify which storage node is responsible for storing the object. For redundancy purposes to protect against failure of a server that stores an object, object storage systems also commonly replicate an object into multiple copies and store the different copies on different servers. Thus, should a server that stores a copy of the object fail, there are still other copies of the object that are available.

A problem with replication is the overhead that is presented to the data center network 105, 106. Here, typically, in order to store an object into the storage system, not only is each copy of the object passed over the data center network 105, 106, but also, a full protocol exchange (e.g., acknowledgements (ACKs)) passed over the network 105, 106 for each copy.

FIG. 1a depicts an exemplary prior art object write scenario. For ease of discussion it is assumed that there are only three copies of a data object stored in the system to effect replication of the stored data object. Also for ease of explanation, all three copies are to be stored in racks that are serviced by one EOR 107 (in actual circumstances object copies may be stored in multiple groups of racks that have multiple corresponding EORs).

As observed in FIG. 1, the client node 109 that receives the data object with the corresponding write command replicates the object into three separate copies and sends the three different objects into the network (through its rack's switch 104_N) with three associated write requests 1 (one for each of the data object copies).

Here, object ID generation intelligence 113 within the client node 109 determines a same object ID to be assigned to each of the three different objects, respectively. A hashing function 114 executed by the client node 109 on the object ID is then able to convert the single object ID into the identity of three different storage nodes (e.g., by identifying their corresponding IP addresses). Here, one copy (or "replica") of the object is to be stored on each of the three different storage nodes. Thus, should one of the objects become lost (e.g., because of the failure of the server that hosts one of the storage nodes), the client node 109 can re-execute the hashing function on the object ID to identify where other copies of the object are stored and access a surviving copy of the object.

The three storage requests 1 are forwarded by the TOR 104_N of the client node's 109 rack 101_N to the EOR unit 107. Again, for ease of example it is assumed that all three object copies are to be stored in one of the racks associated with the EOR unit 107. The respective identifier of each destination storage node (e.g., its IP address) for each of the objects is essentially used by the EOR's networking switch 107 to route 3a, 3b the three object copies with their corresponding write request to their appropriate rack. For the sake of example, two of the copies are to be stored in rack 101_1 and one of the copies is to be stored in rack 101_2. As such, EOR unit routes 3a the two copies whose respective destination corresponds to a storage node within rack 101_1 to rack 101_1. Similarly, the EOR unit 107 routes 3b the single copy and its write request whose respective destination corresponds to a storage node within rack 101_2 to rack 101_2.

Rack 101_1 receives the two copies 3a and its local TOR switch 104_1, forwards each copy to its respective object storage node 110, 111 internally within rack 101_1, and the respective object storage node stores its respective object. Similarly, the TOR switch 104_2 within rack 101_2 routes 4b its received copy of the object to the proper destination object storage node 112 within rack 101_2. The object storage node 112 then stores the object.

Here, in the preceding example, note that the client node 109 includes object ID generation intelligence 113 and hashing intelligence 114 that converts an object's object ID into three destination storage node identifiers (e.g., three IP addresses). The storage requests 1 each include an identity of the destination storage node that is to store the object that is appended to the request (e.g., by way of its IP address). The internal routing/switching tables of the network switches 104, 107 are configured with look up tables or other information that converts the identity of a particular storage node or its IP address to an appropriate output port of the switch. By so doing, the switches of the network 104, 107 are able to route any object to its correct destination storage node.

Figure 1B:
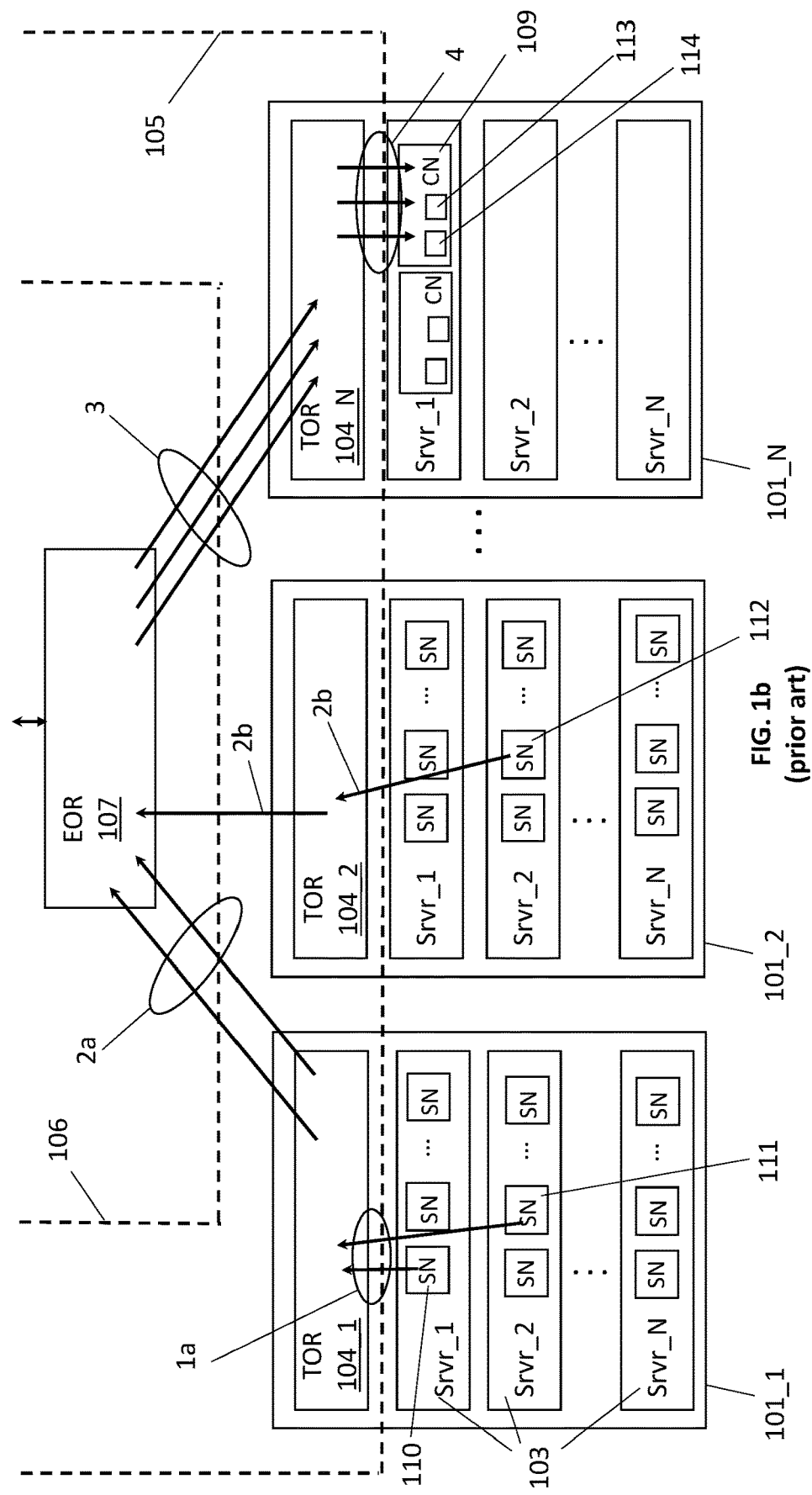
FIG. 1b shows a prior art object storage acknowledgment process.

The prior art write process of FIG. 1a does not deem the write process complete until the client node 109 that originally submitted the storage requests 1 for three copies is informed that all three objects have been successfully stored in their respective storage nodes. FIG. 1b shows a prior art acknowledgement process. Here, after storage nodes 110, 111 within rack 101_1 complete the storage of their respective objects, they each send 1a an acknowledgement (ACK) back to the client node 109 that originally submitted the storage request for the three object copies. Likewise, the object storage node 112 within rack 101_2 sends 1b an ACK back to the client node 109 upon successful storage of its object.

Each of the ACKs identify the client node 109 as the destination. The switches 104, 107 of the network 105, 106 route 2a, 2b, 3, 4 the ACKs back to the client node 109. When the client node 109 receives 4 the three ACKs it understands that three copies of the object have been successfully stored in the system.

With respect to the storage of the object copies, the switches 104, 107 can be seen as having no internal intelligence capabilities of the storage system itself. That is, the network switches 104, 107 are configured to only understand which network addresses correspond to which network destination. That is, as discussed above, the client nodes of the storage application include object_ID generation intelligence 113 and assignment of object_ID to storage node intelligence 114 but the networking switches 104, 107 do not include any such intelligence.

As such, only the client nodes of the application storage system are capable of generating specific object_IDs for specific objects and copies of objects. Additionally, only client nodes are capable of determining which storage nodes the replicas of an object having a particular object_ID should be assigned to.

As a consequence of the lack of storage system intelligence in the network 105, 106, there is complete end-to-end routing traffic flow for each object copy. That is, each copy of the object is provided to the network 105, 106 by the client 109 and forwarded through the network 105, 106 until it reaches its destination storage node.

Likewise, there are three separate ACK flows that originate from each destination storage node, each of which progress through the network 105, 106 and terminate at the client node 109. Because there is an end-to-end traffic flow for each copy of the object (forwards to store the object and backwards to acknowledge the object), the offered load that is presented to the network 105, 106 scales in direct proportion to the number of replicas that the storage system is configured to store per object.

That is, for instance, a storage system that is configured to have six replicas will generate twice as much internal network traffic as a system that is configured to have only three replicas. Unfortunately, the scaling of internal network traffic with the numbers of replicas creates a tradeoff between reliability of the storage system and the performance of the storage system.

Here, the storage system is more reliable with increased number of replicas (the likelihood that data will be truly lost drops with each replica). However, the storage system will be observed by its users to have slower read/write storage access times as the internal traffic of the network increases. Thus, as the number of replicas increases the storage system will become slower from the perspective of the users. This is particularly unfortunate for large mission critical environments (e.g., the core storage system of a large corporation) which highly desire both reliability and performance.

FIG. 2 shows an improved approach in which the object ID generation intelligence 213_1 through 213_N and/or object_ID assignment to storage node intelligence 214_1 through 214_N that has been traditionally reserved for client nodes of the storage application (to generate object IDs and/or determine which specific object IDs are to be stored onto which specific object storage nodes) is embedded within the TOR switching nodes 204_1 through 204_N of the racks of the network 201_1 through 201_N. By so doing, as will be described in detail immediately below, the internal traffic of the network 205, 206 can be greatly reduced because the "per-copy" end-to-end traffic flow environment is dramatically reduced.

Figure 2A:
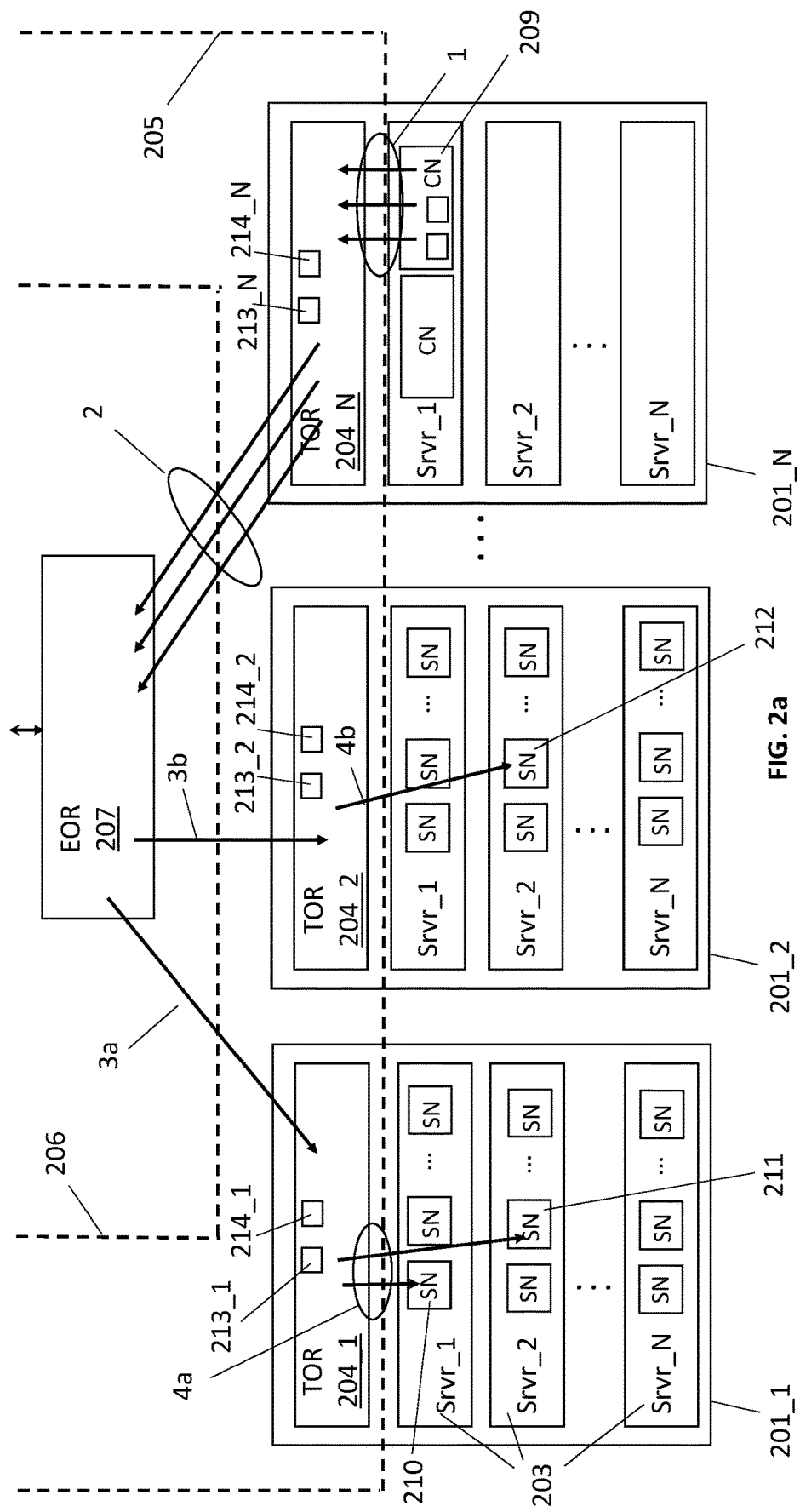
FIG. 2a shows a first improved object storage write process.

Referring to FIG. 2a, according to a first embodiment, e.g., in order to prevent changes to legacy client node software, the client node generates three separate object IDs and sends separate requests for each of three different copies of an object as described above with respect to FIG. 1a. The three separate requests are forwarded to the EOR unit 207. However, in the implementation of FIG. 2a, the EOR unit understands that the TOR switches 204_1 through 204_N of the racks 201_1 through 201_N are upgraded to have storage system intelligence 213, 214 that has been traditionally reserved for the client nodes of the storage application to generate object IDs and/or determine which specific object IDs are to be stored onto which specific object storage nodes.

As such, rather than simply forward all three copies of the object to their appropriate destination (a blind look-up and forward of all input object requests as in FIG. 1a), the EOR 207 will recognize that two of the new requests have a same next hop address (the address of TOR switch 204_1) and will consolidate the two requests into a single request 3a with a single copy of the object. As such, comparing FIG. 2a with FIG. 1a, only a single request and object copy are sent to TOR switch 204_1 in the improved approach of FIG. 2a whereas two requests and object copies are sent to the TOR switch 104_1 in the traditional approach of FIG. 1a. The single forwarded request 3a of FIG. 2a includes the object ID for the object and a single copy of the object. A single request 3b is also sent to TOR switch 204_2 of rack 204_2 in both the approach of FIG. 2a and FIG. 1a.

In response to receiving the single storage request, the TOR switch 204_1 of rack 201_1, having the enhanced storage intelligence 214_1, will perform a hash on the object ID of the single request 3a to identify the destination storage nodes (e.g., the IP addresses) for the object copies. After the hash is preformed, for a redundancy of 3, the TOR switch 204_1 will identify three destination storage nodes. From the destination storage node identities, the TOR switch 204_1 will recognize that two of the destination storage nodes are within the TOR switch's own rack 201_1. The TOR switch 204_1 will then make a copy of the object that was included in the single storage request 3a it received, and, forward first and second copies of the object to the first and second destination storage nodes 210, 211 within rack 201_1, respectively.

The TOR switch 204_2 associated with rack 201_1 will also perform a hash on the primary object ID from the single request 3b it received to generate three destination storage node identifiers (e.g., three IP addresses). Of the three, TOR switch 204_2 will recognize that only one of these corresponds to a storage node within rack 201_2. As such, no additional copies of the object will be made by TOR switch 204_2 (it will forward the single copy it received to destination storage node 212 for storage).

Figure 2B:
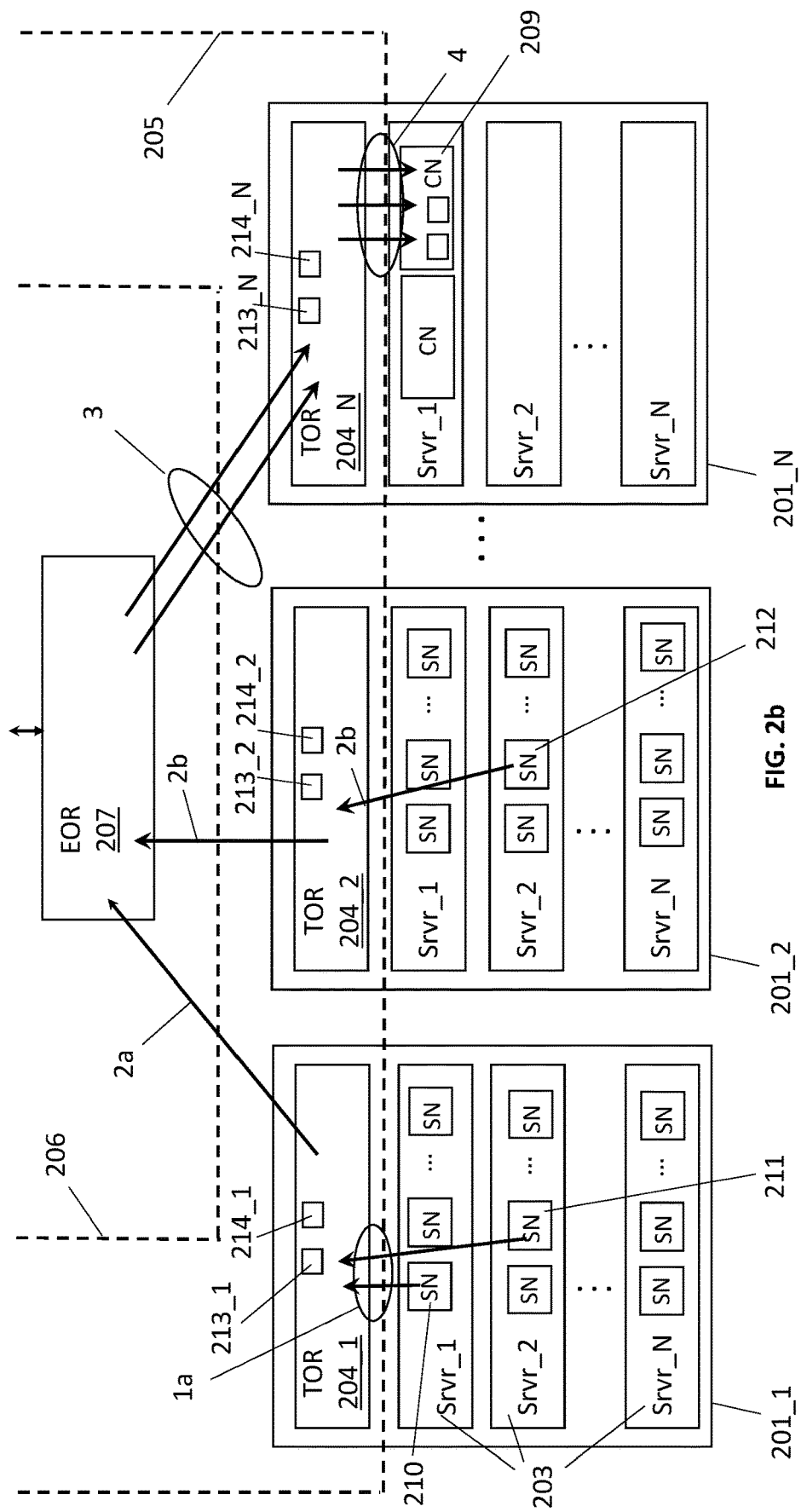
FIG. 2b shows a first improved object storage acknowledgment process.

For the acknowledgements, referring to FIG. 2b, TOR switch 204_1 can combine the two ACKs 1a from storage nodes 210, 211 into a single ACK for both objects that were stored in rack 201_1 (the single ACK may include the object ID and information that verifies the successful storage of two objects). The single ACK is then sent 2a to the EOR unit 207. TOR switch 204_2 will also send 2b a single ACK 2b to EOR unit 207 (which also includes the object ID and successful storage of one object). The EOR unit 207 forwards both ACKS to the TOR switch 204_N in the rack 201N that the client node 209 is within. The TOR switch within rack 201_N, having enhanced functionality, is able to split the ACK from TOR switch 204_1 into two separate ACKs. As such, the legacy client 209 will receive three ACKS and will recognize successful storage of three copies of the object. Thus, additional storage system intelligence that is included in switch 204_N is acknowledgment processing.

In an alternate embodiment, the client understands that the network includes storage system functionality. As such, referring to FIG. 2a, the client 209 issues only one storage request to TOR switch 204_N and TOR switch 204_N performs object ID generation and object ID to storage node correlation with intelligence 213_N and 214_N. TOR switch 204_N can then forward the three requests to the EOR switch 207. The rest of the storage process transpires as described above with respect to FIG. 2a. With respect to the acknowledgment process, switch 204_N can also accumulate the received ACKs and send a single, final ACK to the client 209 when both acknowledgements 3 of FIG. 2b have been received. Thus, again, additional storage system intelligence that is included in switch 204_N is acknowledgement processing. It is pertinent to point out that a single TOR switch as described herein may include all forms of TOR switch intelligence (or some subset thereof).

In the specific embodiments discussed above with respect to FIG. 2a, only the TOR switches 204_1 through 204_N have embedded storage system intelligence (the EOR switch knows that the TOR switches have the embedded storage intelligence but does not have any such intelligence itself).

Figure 3A:
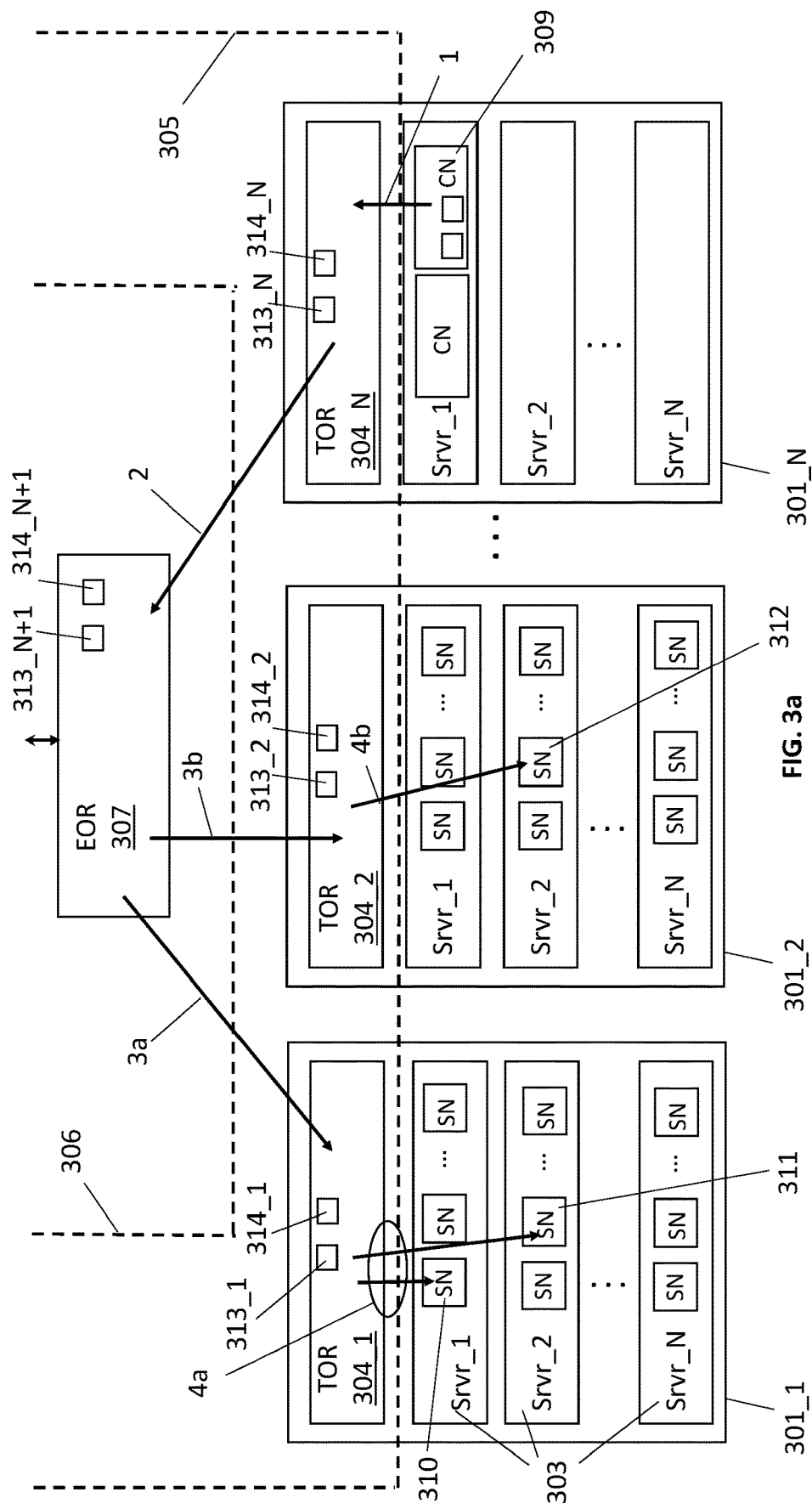
FIG. 3a shows a second improved object storage write process.

FIG. 3a, by contrast, shows another object storage write process embodiment in which the EOR switch 307 also includes storage system intelligence 313_N+1, 314_N+1 (along with the TOR switches). In this case, if the client 309 is upgraded to know that the network 305, 306 includes storage system intelligence, the client 309 can send only one storage request 1 to the TOR switch 304_N unit rather than three storage requests as was performed by the client in the embodiment of FIG. 2a. The TOR switch 304_N may generate an object ID for the object and send a single request that includes the object and the object ID to EOR 307. Additionally, because the EOR switch 307 also has storage system intelligence 313_N+1, 314_N+1, TOR switch 304_N need only forward 2 a single write request and object to the EOR switch 307. In this case, object ID intelligence 313_N+1 of EOR may generate an object ID for the object.

After receipt of the single request with the object and having possession of an object_ID (whether received or locally generated), object ID generation intelligence 314_N+1 of the EOR 307 will perform a hash on the object_ID which will generate three destination storage node identifiers (e.g., three IP addresses). Moreover, the EOR 307 will recognize that two of these storage nodes 310, 311 map to single rack 301_1. As such, the EOR 307 can consolidate the request for these two storage nodes 310, 311 into a single storage request and corresponding object that is sent 3a to TOR switch 304_1.

In a first embodiment, the single request 3a only includes the object ID (does not identify the destinations 310, 311 for the pair of objects that are to be stored in rack 301_1) and the TOR switch 304_1 of rack 301_1 performs the same procedures described above with respect to FIG. 2a (switch 304_1 generates destination addressees for the copies from the object ID in the request). In a second embodiment, the single request 3a identifies both destination nodes 310, 311 and the TOR switch 304_1 duplicates the object and forwards the object copies to both destinations 310, 311 for storage.

The EOR unit 307 also sends a second request 3b with corresponding copy of the object to rack 301_2. The request may conform to any of the embodiments described immediately above, resulting in the storage of the single copy in the appropriate destination storage node 312 within rack 301_2.

Figure 3B:
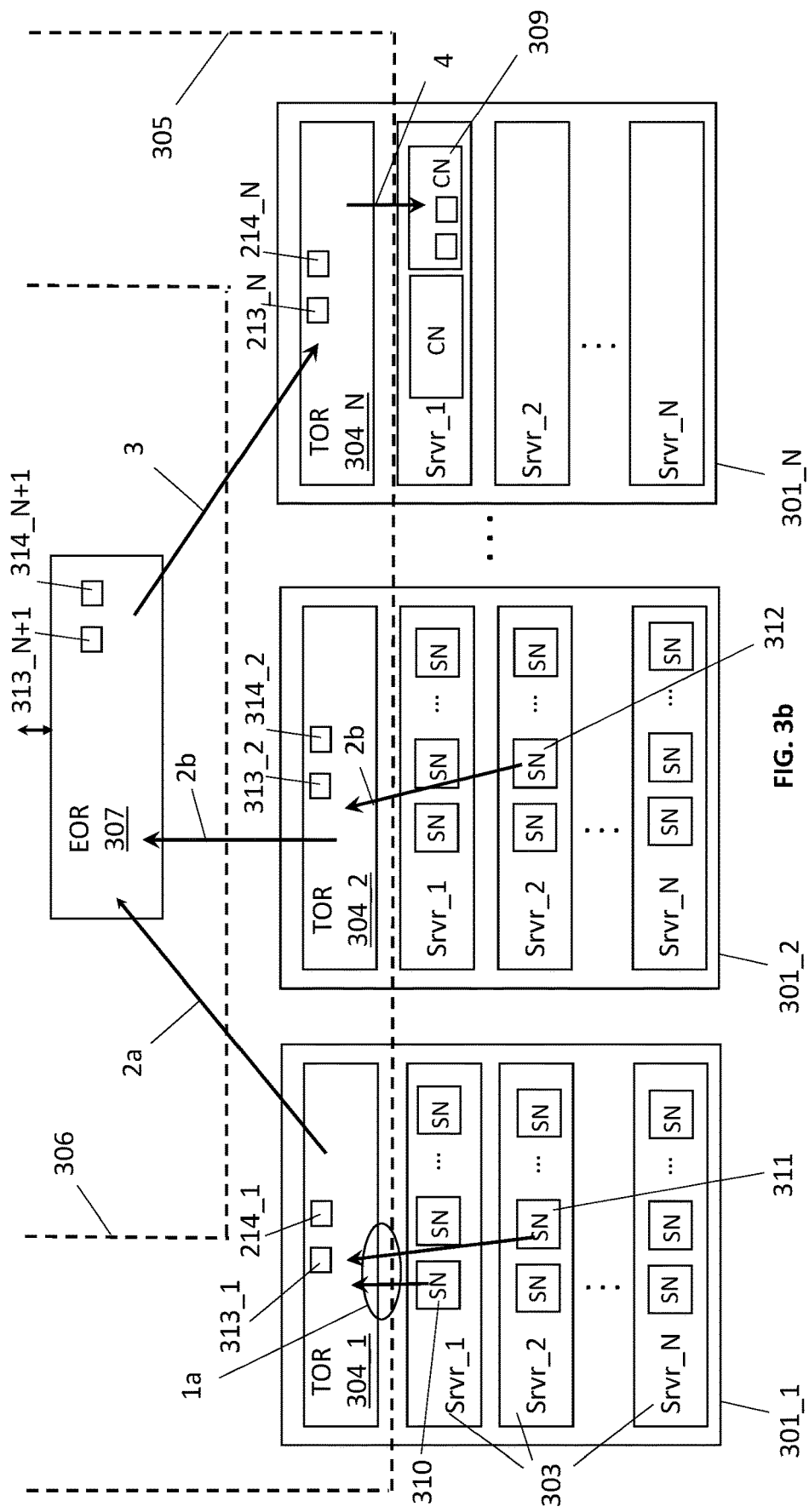
FIG. 3b shows a second improved object storage acknowledgment process.

With respect to the acknowledgements, referring to FIG. 3b, the acknowledgements may reduce to: 1) a single ACK being sent from TOR switch 304_1 to EOR switch 307 that confirms the storage of both copies of the object in rack 301_1; 2) a single ACK being sent from TOR switch 304_2 to EOR switch 307 that confirms the storage of the single copy of the object in rack 301_2; and, 3) a single ACK being sent from the EOR unit 307 to TOR switch 304_N in rack 301_N that confirms the storage of all three objects in the appropriate storage nodes (the EOR includes ACK processing intelligence that can accumulate the ACKS from the racks so that only one ACK is sent toward the client). The TOR switch 304_N can then send a single confirmation to the client 309 or three separate requests to the client 309 depending on whether the client is a legacy client or not.

Figure 4:
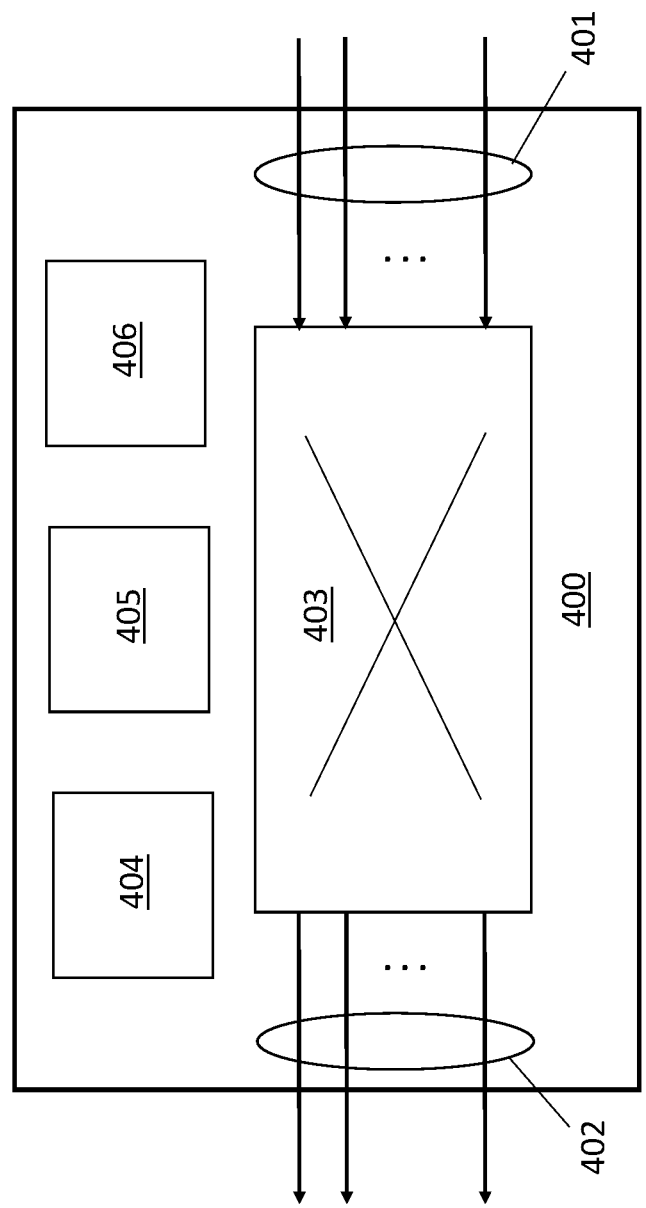
FIG. 4 shows an improved networking switch.

FIG. 4 shows an embodiment of a networking switch 400 that corresponds to either or both of the EOR and TOR units discussed at length above. As observed in FIG. 4, the network switch 400 includes a number of ingress ports 401 and egress ports 402. The ingress ports 401 receive input traffic and the output ports 402 transmit output traffic. A switch core 403 is coupled between the ingress ports 401 and the egress ports 402. The switch core 403 can be implemented with custom dedicated hardware logic circuitry (e.g., application specific integrated circuitry (ASIC) logic circuitry, programmable logic circuitry (e.g., field programmable gate array (FPGA) logic circuitry, programmable logic device (PLD) logic circuitry, programmable logic array (PLA) logic circuitry, etc.), logic circuitry that executes program code that is written to perform network switching and/or routing tasks (e.g., a microprocessor, one or more processing cores of a multi-core processor, etc.) or any combination of these. Programmable logic circuits may be particularly useful in the case of software defined networking and/or software defined storage implementations.

The networking switch 400 also includes object storage intelligence 404, 405, 406 as described above with respect to FIGS. 2a, 2b, 3a and 3b. Here, object storage intelligence 404 is able to generate object IDs for replica objects, e.g., by performing a hash function on an object's primary ID. Object storage intelligence 405 is able to determine an object's storage node from that object's object ID. Object storage intelligence 406 is able to perform various object storage system acknowledgement tasks such as accumulating multiple received acknowledgements and consolidating them to a single acknowledgement, or, splitting a combined acknowledgement into separate acknowledgements. Any of the object storage intelligence 404, 405, 406 may be implemented with any of the types of logic circuitry described in the preceding paragraph or combination thereof. In the case of logic circuitry that executes program code, the program code would be written to perform some object storage intelligence task.

In the aforementioned discussion of the improved flows of FIGS. 2a, 2b, 3a and 3b, generally, packets are sent over the network 205, 206/305, 306 between devices. The payloads of these packets may contain data objects and/or object identifiers of the object storage system (in the storage direction) or acknowledgements of the object storage system (in the acknowledgement direction). The packets may also contain in header or payload information that identifies the packet as an object storage packet and/or which object storage intelligence 404, 405, 406 is to be executed by the networking switch 400 in order to process the packet according to some object storage system related task.

Figure 5:
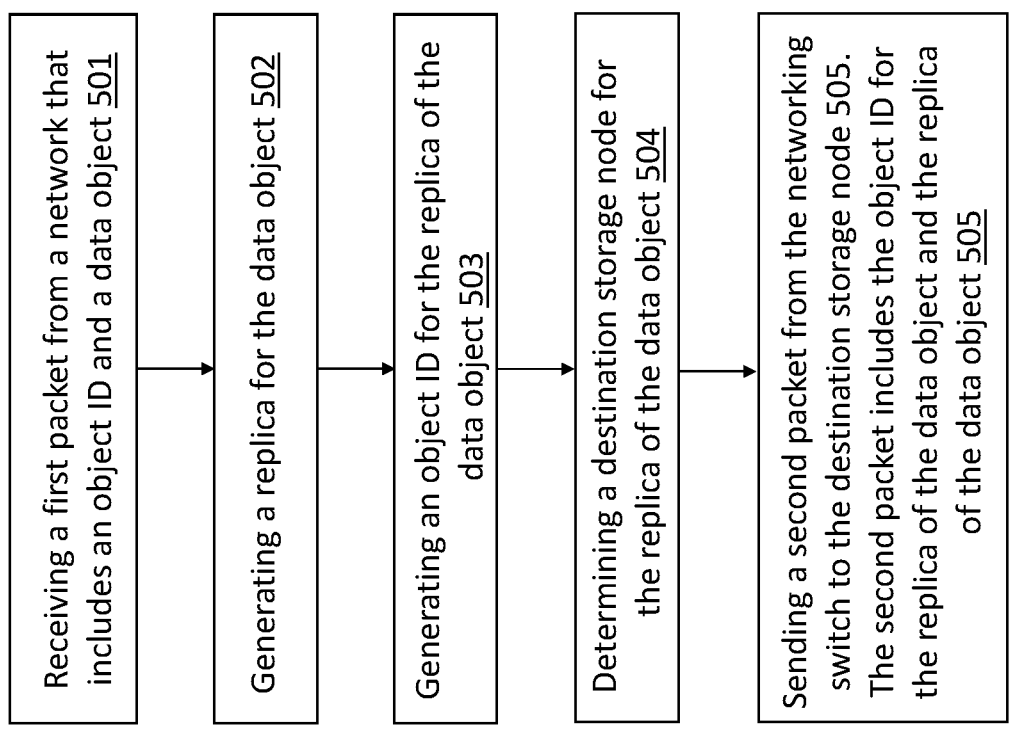
FIG. 5 show a methodology.

FIG. 5 shows a method performed by a networking switch in an object storage system as described above. The method includes receiving a first packet from a network that includes an object ID and a data object 501. The method includes generating a replica for the data object 502. The method includes generating an object ID for the replica of the data object 503. The method includes determining a destination storage node for the replica of the data object 504. The method includes sending a second packet from the networking switch to the destination storage node 505. The second packet includes the object ID for the replica of the data object and the replica of the data object.

FIG. 6 shows a basic model of a basic computing system which may represent any of the servers described above. As observed in FIG. 6, the basic computing system 600 may include a central processing unit 601 (which may include, e.g., a plurality of general purpose processing cores 615_1 through 615_X) and a main memory controller 617 disposed on a multi-core processor or applications processor, system memory 602, a display 603 (e.g., touchscreen, flat-panel), a local wired point-to-point link (e.g., USB) interface 604, various network I/O functions 605 (such as an Ethernet interface and/or cellular modem subsystem), a wireless local area network (e.g., WiFi) interface 606, a wireless point-to-point link (e.g., Bluetooth) interface 607 and a Global Positioning System interface 608, various sensors 609_1 through 609_Y, one or more cameras 610, a battery 611, a power management control unit 612, a speaker and microphone 613 and an audio coder/decoder 614.

An applications processor or multi-core processor 650 may include one or more general purpose processing cores 615 within its CPU 601, one or more graphical processing units 616, a memory management function 617 (e.g., a memory controller) and an I/O control function 618. The general purpose processing cores 615 typically execute the operating system and application software of the computing system. The graphics processing unit 616 typically executes graphics intensive functions to, e.g., generate graphics information that is presented on the display 603. The memory control function 617 interfaces with the system memory 602 to write/read data to/from system memory 602. The power management control unit 612 generally controls the power consumption of the system 600.

Each of the touchscreen display 603, the communication interfaces 604-1107, the GPS interface 608, the sensors 609, the camera(s) 610, and the speaker/microphone codec 613, 614 all can be viewed as various forms of I/O (input and/or output) relative to the overall computing system including, where appropriate, an integrated peripheral device as well (e.g., the one or more cameras 610). Depending on implementation, various ones of these I/O components may be integrated on the applications processor/multi-core processor 650 or may be located off the die or outside the package of the applications processor/multi-core processor 650.

The computing system may also include a system memory (also referred to as main memory) having multiple levels. For example a first (faster) system memory level may be implemented with DRAM and a second (slower) system memory may be implemented with an emerging non-volatile memory (such as non-volatile memory whose storage cells are composed of chalcogenide, resistive memory (RRAM), ferroelectric memory (FeFRAM), etc.). Emerging non volatile memory technologies have faster access times that traditional FLASH and can therefore be used in a system memory role rather than be relegated solely to mass storage.

Software and/or firmware executing on a general purpose CPU core (or other functional block having an instruction execution pipeline to execute program code) of processor may perform any of the functions described above.

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired logic for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A networking switch, comprising:
a plurality of ingress ports;
a plurality of egress ports;
a switch core coupled between the ingress ports and the egress ports;
object storage system intelligence logic circuitry, said object storage system intelligence logic circuitry to perform a), b), c), and d) below:
a) generate object IDs for object replicas, the object replicas to each contain same information, the object storage system intelligence logic circuitry to protect against loss of the information by storing the object replicas in different destination storage nodes of an object storage system;
b) determine a destination storage node from an object ID for an object having the object ID without previously having been configured with information that indicates that the object ID is to be stored in the destination storage node;
c) convert a single write request with a first corresponding object into multiple write requests having respective replicas of the first corresponding object, and/or, consolidate multiple write requests with a second corresponding object into a single write request with the second corresponding object; and,
d) consolidate multiple acknowledgements for multiple stored objects into a single acknowledgement.

2. The networking switch of claim 1 wherein the networking switch is to provide networking services for a group of servers.

3. The networking switch of claim 2 wherein the networking switch is integrated into a rack.

4. The networking switch of claim 1 wherein the networking switch is to provide networking services for a group of racks of servers.

5. The networking switch of claim 1 wherein the object storage system intelligence logic circuitry is to perform a hash on the object ID.

6. The networking switch of claim 1 wherein the networking switch is integrated into a rack and is to receive a storage request from a client for the object without receiving any replicas of the object.

7. The networking switch of claim 1 wherein the networking switch is not integrated into a rack and is to receive a storage request for the object without receiving any replicas of the object.

8. An object storage system, comprising:
multiple servers, respective CPU cores of the multiple servers to execute at least one of client node object storage system program code and storage node object storage system program code;
a plurality of networking switches coupled between the multiple servers, a networking switch of the networking switches comprising object storage system intelligence logic circuitry, said object storage system intelligence logic circuitry to perform one or more of a), b), c), and d) below:
a) generate object IDs for object replicas, the object replicas to each contain same information, the object storage system intelligence logic circuitry to protect against loss of the information by storing the object replicas in different destination storage nodes of an object storage system;
b) determine a destination storage node from an object ID for an object having the object ID without previously having been configured with information that indicates that the object ID is to be stored in the destination storage node;
c) convert a single write request with a first corresponding object into multiple write requests having respective replicas of the first corresponding object, and/or, consolidate multiple write requests with a second corresponding object into a single write request with the second corresponding object; and,
d) consolidate multiple acknowledgements for multiple stored objects into a single acknowledgement.

9. The object storage system of claim 8 wherein the networking switch is integrated within a rack.

10. The object storage system of claim 8 wherein the networking switch is to provide networking services for a group of racks of servers.

11. The object storage system of claim 8 wherein the object storage system intelligence logic circuitry is to perform a hash on the object ID.

12. The object storage system of claim 8 wherein the networking switch is integrated into a rack and is to receive a storage request from a client for the object without receiving any replicas of the object.

13. The object storage system of claim 8 wherein the networking switch is not integrated within a rack and is to receive a storage request for the object without receiving any replicas of the object.

14. A method, comprising:
performing the following by a networking switch in an object storage system, wherein, the networking switch does not include destination storage nodes for the object storage system:
  receiving a first packet from a network comprising a first object ID and a data object;
  generating object replicas for the data object, the object replicas to each contain same information, the object storage system to protect against loss of the same information by storing the object replicas in different storage nodes of the object storage system;
  forwarding the first packet to a first destination storage node for the data object;
  generating a second object ID for a replica of the data object, the replica of the data object being one of the object replicas for the data object;
  determining a second destination storage node for the replica of the data object, the second destination storage node being a different storage node than the first destination storage node;
  sending a second packet from the networking switch to the second destination storage node, the second packet comprising the second object ID for the replica of the data object and the replica of the data object;
  receiving a first acknowledgement from the first destination storage node that the data object has been stored;
  receiving a second acknowledgment from the second destination storage node that the replica of the data object has been stored;
  consolidating the first and second acknowledgements into a third acknowledgment and sending the third acknowledgement into the network to a sender of the first packet.

15. The method of claim 14 wherein the networking switch is integrated within a rack.

16. The method of claim 15 wherein the first object ID is a primary object ID.

17. The method of claim 14 wherein the networking switch is coupled to multiple racks.

18. The method of claim 14 wherein the first destination storage node and the second destination storage node are in different racks.

19. The method of claim 14 wherein the first destination storage node and the second destination storage node are in different servers of a same rack and the networking switch is integrated within the rack.

* * * * *